United States Patent
Ohta (10) Patent No.: US 10,248,843 B2
(45) Date of Patent: Apr. 2, 2019

(54) IMAGE PROCESSING APPARATUS AND METHOD FOR REMOVING A FACIAL OBJECT

(71) Applicant: OMRON Corporation, Kyoto (JP)

(72) Inventor: Takashi Ohta, Shiga (JP)

(73) Assignee: Omron Corporation, Kyoto (JP)

( * ) Notice: Subject to any disclaimer, the term of this patent is extended or adjusted under 35 U.S.C. 154(b) by 231 days.

(21) Appl. No.: 14/930,333

(22) Filed: Nov. 2, 2015

(65) Prior Publication Data

US 2016/0267320 A1 Sep. 15, 2016

(30) Foreign Application Priority Data

Mar. 12, 2015 (JP) .................................. 2015-049733

(51) Int. Cl.
*H04N 1/60* (2006.01)
*H04N 1/62* (2006.01)
(Continued)

(52) U.S. Cl.
CPC ..... *G06K 9/00268* (2013.01); *G06K 9/00255* (2013.01); *G06K 9/4652* (2013.01);
(Continued)

(58) Field of Classification Search
CPC ........... G06T 2207/30201; G06T 5/005; G06T 11/60; G06T 7/90; G06T 7/11;
(Continued)

(56) References Cited

U.S. PATENT DOCUMENTS 6,141,431 A 10/2000 Munetsugu et al.
2007/0041640 A1 2/2007 Tabata et al.
(Continued)

FOREIGN PATENT DOCUMENTS

CN 101079952 A 11/2007
JP H08-329278 A 12/1996
(Continued)

OTHER PUBLICATIONS

Extended European Search Report in counterpart European Application No. 15 19 0703.7 dated Jul. 27, 2016 (8 pages).
(Continued)

*Primary Examiner* — Alison Slater
(74) *Attorney, Agent, or Firm* — Osha Liang LLP (57) ABSTRACT

An apparatus having an image acquiring unit configured to acquire the face image. The apparatus additionally having a first determining unit configured to determine a representative pixel value representing a skin region, based on pixels included in the face image, a region generating unit configured to generate a first region including the object, and a second determining unit configured to determine correction pixels, which are one or more pixels used for the correction, out of pixels present in a vicinity of the first region, based on similarity to the representative pixel value. The apparatus also having a partial-image generating unit configured to generate a partial image, which is a collection of pixels for replacing pixels corresponding to the object, using the correction pixels, and a correcting unit configured to perform correction by combining the partial image with the face image.

6 Claims, 10 Drawing Sheets

(51) Int. Cl.
    *G06K 9/00* (2006.01)
    *G06T 5/00* (2006.01)
    *G06T 11/60* (2006.01)
    *G06K 9/46* (2006.01)
    *G06K 9/52* (2006.01)
    *G06K 9/62* (2006.01)
    *G06T 7/60* (2017.01)

(52) U.S. Cl.
    CPC ............ *G06K 9/52* (2013.01); *G06K 9/6215* (2013.01); *G06T 5/00* (2013.01); *G06T 5/005* (2013.01); *G06T 7/60* (2013.01); *G06T 11/60* (2013.01); *G06K 2009/4666* (2013.01); *G06T 2207/20024* (2013.01); *G06T 2207/30201* (2013.01)

(58) Field of Classification Search
    CPC . G06T 2207/10024; G06T 2207/20024; G06T 2207/30088; G06T 7/73; G06K 9/00268; G06K 9/00248; G06K 9/00281; G06K 9/00234; G06K 9/4652; H04N 1/62; H04N 1/40093; A45D 44/005; A45D 2044/007
    See application file for complete search history.

(56) References Cited

U.S. PATENT DOCUMENTS

| | | |
|---|---|---|
| 2007/0071347 A1 | 3/2007 | Li et al. |
| 2007/0274573 A1 | 11/2007 | Hori |
| 2013/0016246 A1 | 1/2013 | Hatanaka et al. |
| 2013/0271485 A1* | 10/2013 | Aoki .................... A45D 44/005 345/593 |
| 2015/0254500 A1* | 9/2015 | Izumi ..................... G06T 11/60 348/78 |

FOREIGN PATENT DOCUMENTS

| | | |
|---|---|---|
| JP | H09-261580 A | 10/1997 |
| JP | H11-25253 A | 1/1999 |
| JP | H11-073498 A | 3/1999 |
| JP | 2004-30007 A | 1/2004 |
| JP | 2004-242272 A | 8/2004 |
| JP | 2005-276182 A | 10/2005 |
| JP | 2006-31620 A | 2/2006 |
| JP | 2007-87234 A | 4/2007 |
| JP | 2009-070260 A | 4/2009 |
| JP | 2011-170838 A | 9/2011 |
| JP | 2012-098808 A | 5/2012 |
| JP | 2013-161348 A | 8/2013 |
| JP | 2013-171423 A | 9/2013 |
| WO | 2015/029392 A1 | 3/2015 |

OTHER PUBLICATIONS

Notification of Reason for Refusal issued in corresponding Korean Application No. 10-2015-0146008, dated Sep. 12, 2016 (11 pages).
Chi-Shing Wong et al.; "Adaptive Directional Window Selection for Edge-Directed Interpolation"; Computer Communications and Networks, Proceedings IEEE; 2010 (6 pages).
Office Action issued in corresponding European Application No. 15190703.7, dated Jan. 31, 2018 (5 pages).
Office Action issued in Chinese Application No. 201510711088.2, dated Jul. 4, 2018 (18 pages).
Notification of Reasons for Refusal issued in Japanese Application No. 2015-049733, dated Jul. 17, 2018 (4 pages).

* cited by examiner

IMAGE PROCESSING APPARATUS AND METHOD FOR REMOVING A FACIAL OBJECT

CROSS-REFERENCE TO RELATED APPLICATION

This application is based on Japanese Patent Application No. 2015-049733 filed with the Japan Patent Office on Mar. 12, 2015, the entire contents of which are incorporated herein by reference.

BACKGROUND OF THE INVENTION

Field of the Invention

The present invention relates to an image processing technique for deleting an unnecessary object included in an image.

Description of the Related Art

In recent years, a technique for automatically correcting an image including a face of a person (a face image) photographed using a digital camera or the like is becoming more common. Deleting an unnecessary object included in an image is an example of such a technique. For example, by removing moles or wrinkles on a face, it is possible to make skin look beautiful. By detecting and removing eyebrows, it is possible to redraw the eyebrows.

As the technique for deleting an unnecessary object included in an image, for example, there is an image processing apparatus described in Japanese Patent Application Laid-Open No. 2011-170838. The image processing apparatus searches for, in an image, a region similar to a region where an unnecessary object is present and replaces the unnecessary object together with the region to thereby remove the unnecessary object.

SUMMARY OF THE INVENTION

If it is attempted to remove an unnecessary object (a mole, a wrinkle, an eyebrow, etc.) included in a face of a person using the apparatus described in Japanese Patent Application Laid-Open No. 2011-170838, artificiality sometimes remains in an image after processing. This is because a shade caused by a way of irradiation of illumination or the like is different for each part. For example, even if calculated values (e.g., totals of differences of luminance values) of pixels are similar between regions, if regions having different shades are selected, an unnatural correction result is obtained.

In order to solve this problem, a technique for removing only a removal target object without substantially changing pixel values around the removal target object is necessary.

The present invention has been devised in view of the above problems and it is an object of the present invention to provide a technique for removing an unnecessary object included in an image without a sense of discomfort.

The present invention in its one aspect provides an image processing apparatus that performs correction for removing an object from a face image, which is an image including a face of a person, the image processing apparatus comprises an image acquiring unit configured to acquire the face image; a representative-pixel-value determining unit configured to determine a representative pixel value, which is a pixel value representing a skin region, on the basis of pixels included in the face image; a region generating unit configured to generate a first region, which is a region including the object; a correction-pixel determining unit configured to determine correction pixels, which are one or more pixels used for the correction, out of a plurality of pixels present in a vicinity of the first region, on the basis of similarity to the representative pixel value; a partial-image generating unit configured to generate a partial image, which is a collection of pixels for replacing pixels corresponding to the object, using the correction pixels; and a correcting unit configured to perform correction by combining the partial image with the face image.

The image processing apparatus according to the present invention is an apparatus that performs image correction for removing a target object included in a face image. The target object may be anything such as an eyebrow, a mole, a wrinkle, a freckle, a birthmark, or a scar on the surface of skin.

The representative-pixel-value determining unit is a unit that determines a pixel value representing a surface region (a skin region) of a face included in an image. The representative pixel value can be calculated on the basis of, for example, a result obtained by sampling a plurality of pixels corresponding to skin.

The region generating unit is a unit that generates a region (a first region) including a removal target object. For example, when there is information concerning a feature point corresponding to the removal target object, the first region may be generated on the basis of the information or a user of the apparatus may directly designate the first region.

The correction-pixel determining unit is a unit that determines pixels (correction pixels) used in correcting the first region, that is, performing image processing for removing an object. The correction pixels are selected on the basis of similarity to the representative pixel value out of pixels present in the vicinity of the first region. For example, the similarity may be determined on the basis of a difference in a luminance component from the representative pixel value or may be determined on the basis of a difference in a hue.

The partial-image generating unit is a unit that generates, on the basis of the determined correction pixels, a partial pixel from which the object is removed. The partial-image generating unit generates, for example, on the basis of the correction pixels, as the partial image, an image obtained by interpolating the first region.

The partial image generated in this way is an image generated making use of information such as luminance and a hue of the pixels present around the first region and on the basis of pixels having a pixel value closer to the representative pixel value. Therefore, a pixel value of the partial image does not greatly fluctuate before and after correction. That is, it is possible to perform natural correction.

The correction pixels may include a plurality of pairs of first correction pixels and second correction pixels opposed to each other across the first region. The partial-image generating unit may generate, for each of the pairs, a pixel row for connecting the first correction pixel and the second correction pixel to generate a partial image in which the first region is interpolated. The color of the pixels included in the pixel row may change stepwise from a color of the first correction pixel to a color of the second correction pixel.

The correction pixels are desirably a pair of pixels opposed to each other across the first region. Consequently, it is possible to interpolate a color of the pixels present in the middle (the pixels present in the first region). By changing a color of the pixels stepwise, it is possible to perform interpolation without a sense of discomfort.

The first region may be a region having an elliptical shape. The first correction pixels and the second correction pixels may be pixels opposed to each other across the first region along a minor axis direction of the elliptical shape.

When the first region has the elliptical shape, it is desirable to perform the interpolation along the minor axis direction. Consequently, an amount of information that should be interpolated decreases. It is possible to obtain a more natural correction result.

The region generating unit may further generate a second region which is included in the first region, includes the object, and includes a skin region smaller than the skin region of the first region. The correcting unit may correct the face image by combining the partial image inside the second region.

The region for obtaining the correction pixels is desirably a region including the skin region. On the other hand, the region to be corrected is desirably a small region including only the object. Therefore, after generating the second region included in the first region, correction may be applied to the second region.

The partial-image generating unit may further apply a smoothing filter to the generated partial image.

When the pixel row for coupling the first correction pixels and the second correction pixels is simply generated, an edge sometimes occurs along a direction in which the pixels are generated. Therefore, by further applying the filter for smoothing the partial image, it is possible to reduce the edge.

Note that the present invention can be specified as an image processing apparatus including at least a part of the units. The present invention can also be specified as an image processing method performed by the image processing apparatus. The present invention can also be specified as a computer program for causing a computer to execute the image processing method. The processing and the units can be freely combined and implemented as long as technical contradiction does not occur.

According to the present invention, it is possible to remove an unnecessary object included in an image without a sense of discomfort.

DESCRIPTION OF THE EMBODIMENTS

A preferred embodiment of the present invention is explained below with reference to the drawings.

Figure 1:
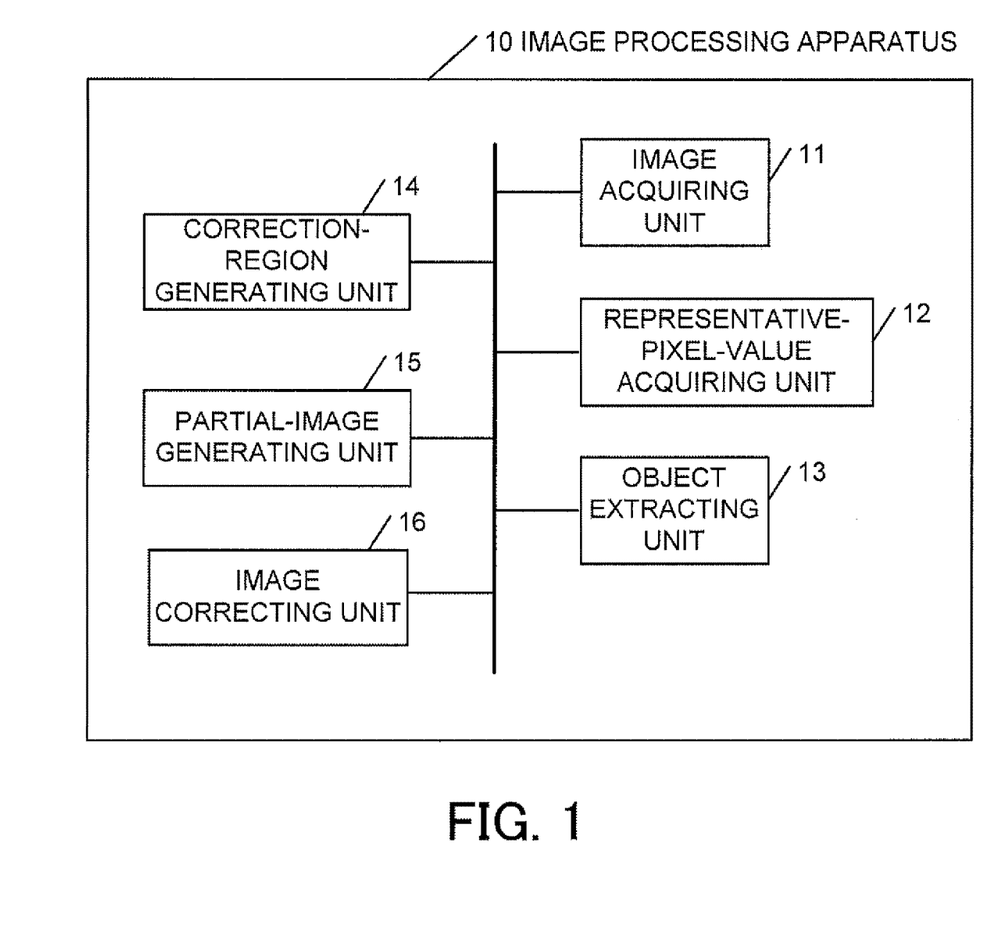
FIG. 1 is a system configuration diagram of an image processing apparatus according to an embodiment.

An image processing apparatus according to this embodiment is an apparatus that acquires an image including a face and applies correction for removing an eyebrow to the image. FIG. 1 is a system configuration diagram of an image processing apparatus 10 according to this embodiment.

First Embodiment

The image processing apparatus 10 according to a first embodiment includes an image acquiring unit 11, a representative-pixel-value acquiring unit 12, an object extracting unit 13, a correction-region generating unit 14, a partial-image generating unit 15, and an image correcting unit 16.

The image acquiring unit 11 is a unit that acquires a processing target image (an image including a face of a person; hereinafter, face image). Typically, the image acquiring unit 11 is a storage device such as a fixed disk drive or a flash memory. Note that the image acquiring unit 11 may be a unit (e.g., an interface device or a radio communication device) that acquires an image from the outside of the apparatus or may be a unit that picks up an image via a lens and an image pickup element. The processing target image may be an image corresponding to frames forming a moving image.

Note that, in this embodiment, a color space of the face image is YCbCr. However, the color space may be RGB, Lab, or the like.

The representative-pixel-value acquiring unit 12 is a unit that acquires a pixel value representing skin of a person included in the face image (hereinafter, representative pixel value). Specifically, the representative-pixel-value acquiring unit 12 samples a plurality of pixels from a region corresponding to the surface of the face and calculates a single pixel value on the basis of a sampling result. A specific processing method is explained below.

The object extracting unit 13 is a unit that detects an object that should be removed from the face image and segments an image including the object. Specifically, the object extracting unit 13 detects feature points corresponding to an eye and an eyebrow of a person from the face image and, after specifying a region where the eyebrow is present, clips the region. The feature points to be detected are desirably points corresponding to the contour of the eyebrow, points corresponding to the outer corner of the eye and the inner corner of the eye, and the like. In the following explanation, an image after the clipping is referred to as eyebrow image.

Note that, in an example explained in this embodiment, the removal target object is the eyebrow. However, the target object may be a mole, a wrinkle, or the like present on the surface of the face.

The correction-region generating unit 14 is a unit that generates a target region where image processing for removing the eyebrow is performed (hereinafter, first eyebrow region) and a region larger than the first eyebrow region and including the first eyebrow region (hereinafter, second eyebrow region). Details concerning the first eyebrow region and the second eyebrow region and a specific processing method are explained below.

The partial-image generating unit 15 is a unit that generates a partial image on the basis of information concerning the including region generated by the correction-region generating unit 14 and the representative pixel value acquired by the representative-pixel-value acquiring unit 12. The partial image is an image for performing removal of the eyebrow by being combined with the first eyebrow region.

The image correcting unit 16 is a unit that performs correction for the face image using the partial image generated by the partial-image generating unit 15. When the image correcting unit 16 performs the correction, an unnecessary object (in this embodiment, the eyebrow) included in the face image is removed.

Note that the units explained above may be realized by exclusively designed hardware or may be realized by software modules. The units may be realized by a field programmable gate array (FPGA), an application specific integrated circuit (ASIC), or the like or may be realized by a combination of these.

When the units are configured as software, a computer program stored in an auxiliary storage device is loaded to a main storage device and executed by a CPU, whereby the units function. (None of the CPU, the auxiliary storage device, and the main storage device is shown in the figure.)

A unit that executes the computer program is not limited to the CPU and may be an image signal processor (ISP), a digital signal processor (DSP), a graphics processing unit (GPU), or the like.

Figure 2:
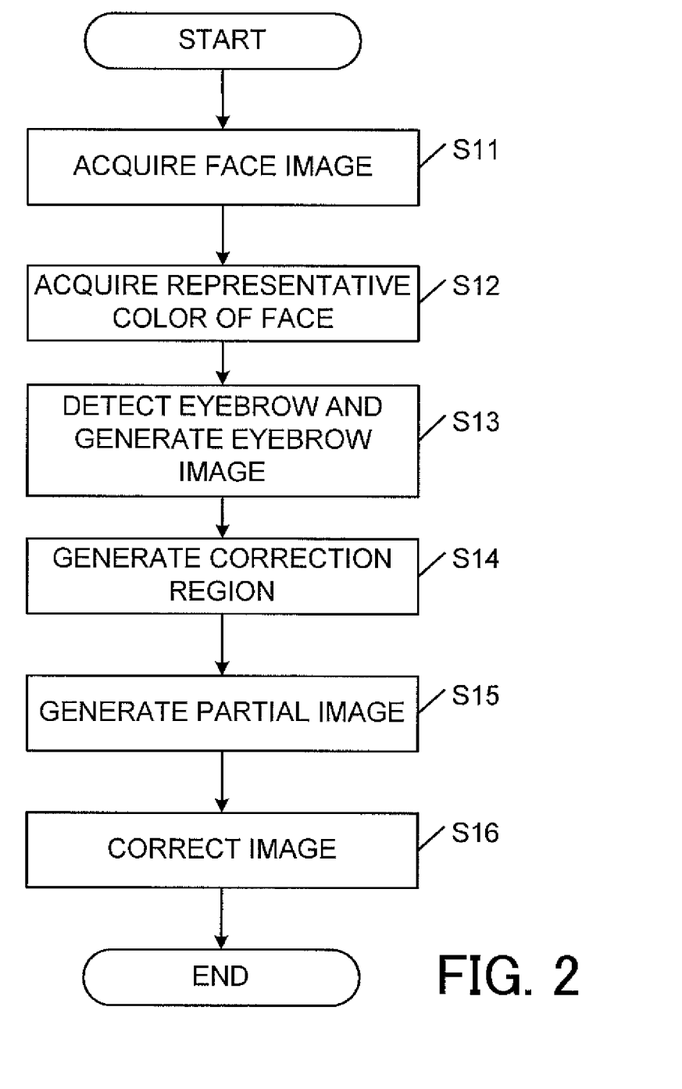
FIG. 2 is a flowchart of processing performed by the image processing apparatus.

Processing for removing an eyebrow included in an acquired face image is explained in order with reference to FIG. 2, which is a flowchart of processing performed by the image processing apparatus 10. The processing shown in FIG. 2 is started on the basis of an instruction from a user of the apparatus.

First, the image acquiring unit 11 acquires a face image (step S11). In this embodiment, a face image stored in advance is acquired from a storage device. However, a face image may be acquired via a communication unit or an image pickup unit.

Figure 3:
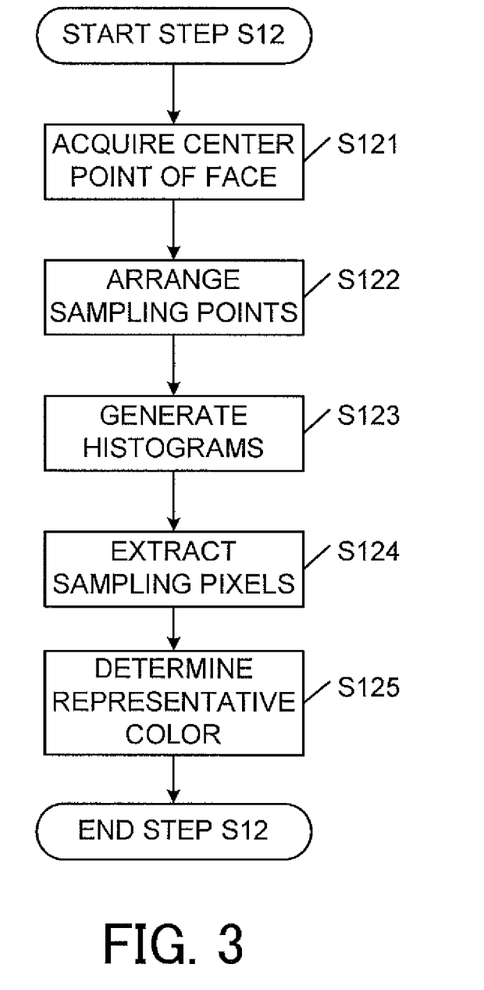
FIG. 3 is a flowchart for explaining, in detail, processing for acquiring a representative pixel value.

Subsequently, the representative-pixel-value acquiring unit 12 acquires the face image acquired by the image acquiring unit 11 and a representative pixel value, which is a pixel value representing a face (step S12). FIG. 3 is a flowchart for explaining, in detail, content of the processing performed in step S12.

First, the representative-pixel-value acquiring unit acquires a center point of the face (step S12). The center point of the face can be set, for example, at the tip of a nose or in the vicinity of the nose. However, the center point is desirably set in a place less easily affected by a make-up and illumination.

Subsequently, the representative-pixel-value acquiring unit 12 arranges points for performing sampling of pixels (hereinafter, sampling points) in the vicinity of the detected center point (step S122). For example, the representative-pixel-value acquiring unit 12 arranges 256 sampling points in a region of 16×16 pixels centering on the center point acquired in step S121. Note that the sampling points are arranged to overlap pixels.

Subsequently, the representative-pixel-value acquiring unit 12 acquires Y components, Cb components, and Cr components for the respective pixels on which the sampling points are arranged and generates histograms of values of the respective components (step S123).

Subsequently, the representative-pixel-value acquiring unit 12 calculates averages μ for the generated three histograms, extracts only pixels in which all of the three values belong to a predetermined range centering on the averages, and sets the pixels as sampling pixels (step S124). For example, when a standard deviation is represented as σ and the predetermined range is represented as ±2σ, only sampling pixels in which all of the Y components, the Cb components, and the Cr components are present in the range of ±2σ centering on the averages are extracted.

Subsequently, in step S125, the representative-pixel-value acquiring unit 12 determines a representative pixel value of a skin region using the extracted sampling pixels. The representative pixel value can be determined using, for example, the averages of the Y components, the Cb components, and the Cr components of the sampling pixels. However, the representative pixel value may be determined using other methods.

The representative pixel value corresponding to the face is determined by the processing explained above.

Figure 4:
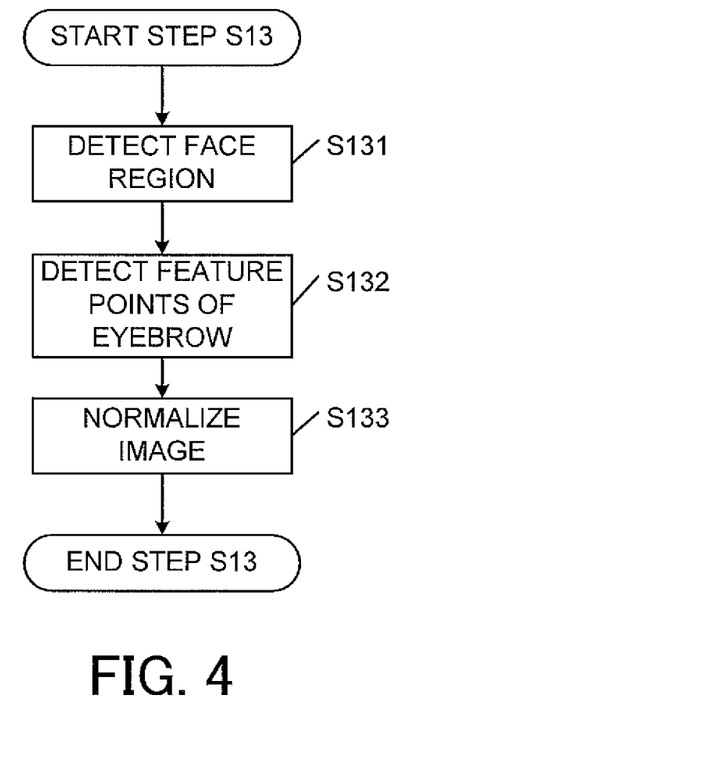
FIG. 4 is a flowchart of processing for extracting a removal target object.

Subsequently, the object extracting unit 13 extracts a removal target eyebrow from the face image and clips a region including the eyebrow to generate an eyebrow image (step S13). FIG. 4 is a flowchart for explaining, in detail, content of the processing performed in step S13.

First, in step S131, the object extracting unit 13 extracts a rectangular region corresponding to the face included in the image (hereinafter, face region). A method of extracting a face region from an image is publicly known. Therefore, detailed explanation of the method is omitted.

Subsequently, in step S132, the object extracting unit 13 detects the eyebrow included in the face region. In this embodiment, the object extracting unit 13 detects, with a known method, feature points corresponding to the contour of the eyebrow and feature points corresponding to the outer corner of the eye and the inner corner of the eye. Note that, when failing in the detection of the feature points, after performing filtering, the object extracting unit 13 may detect the eyebrow through matching processing.

Subsequently, in step S133, the object extracting unit 13 performs normalization of the image. Specifically, the object extracting unit 13 clips the face region and generates a rectangular image having a predetermined size such that feature points corresponding to the left end and the right end of the eyebrow are placed in predetermined coordinates. In generating the rectangular image, the object extracting unit 13 may perform conversion of resolution using any interpolation method. When the eyebrow included in the face image is not horizontal, the object extracting unit 13 may perform the clipping after performing processing for rotating the eyebrow to be horizontal using affine transformation or the like.

Note that the eyebrow image may be a color image or may be a set of a plurality of images in which color information is separated. For example, when a color space of the face image is YCbCr, a set of three images in which Y components, Cb components, and Cr components are respectively separated may be the eyebrow image.

Figure 5A:
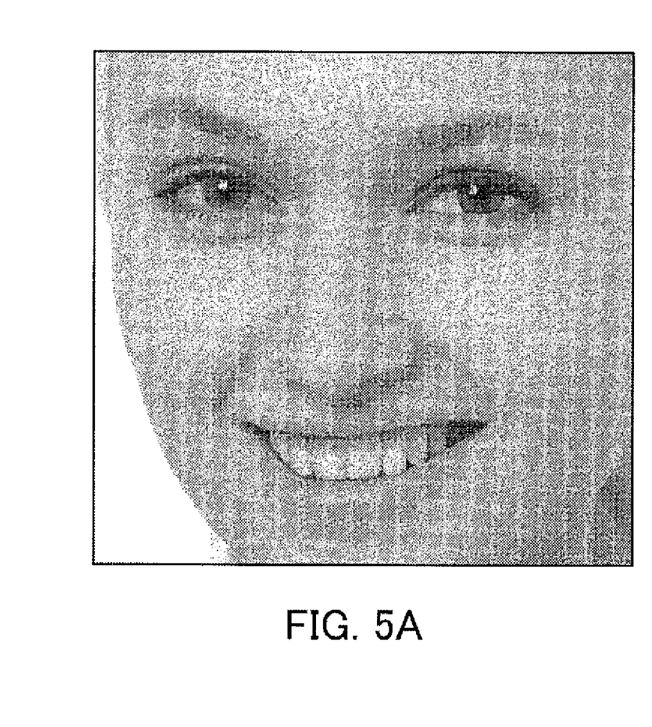
FIGS. 5A and 5B are examples of a face image and an eyebrow image.
Figure 5B:
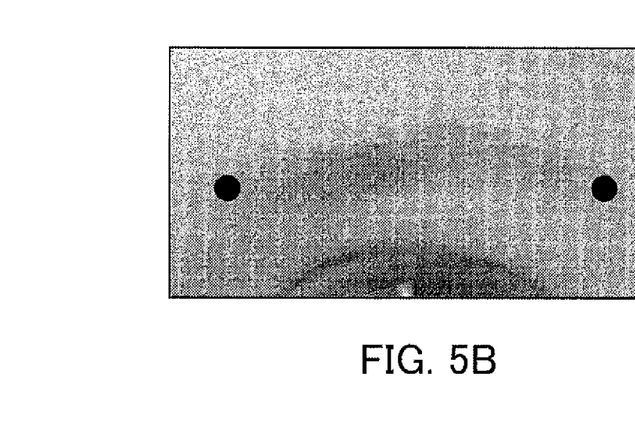

FIG. 5A is an example of the face image. FIG. 5B is an example of the eyebrow image. Black points shown in FIG. 5B are feature points representing the left end and the right end of the eyebrow. Note that, in this example, only the left eyebrow is set as a processing target. However, when both the eyebrows are set as processing targets, the processing explained in this specification only has to be repeated in step S133 and subsequent steps.

Figure 6:
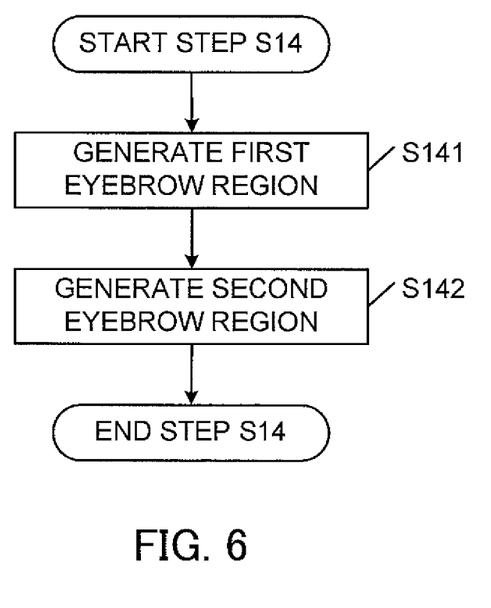
FIG. 6 is a flowchart for explaining processing for generating a correction region.

Subsequently, the correction-region generating unit generates a correction region on the basis of the eyebrow image generated in step S13 (step S14). FIG. 6 is a flowchart for explaining, in detail, content of the processing performed in step S14.

First, in step S141, the correction-region generating unit 14 generates a first eyebrow region. The first eyebrow region is a region where the shape of the eyebrow is represented by three ellipses.

Figure 7:
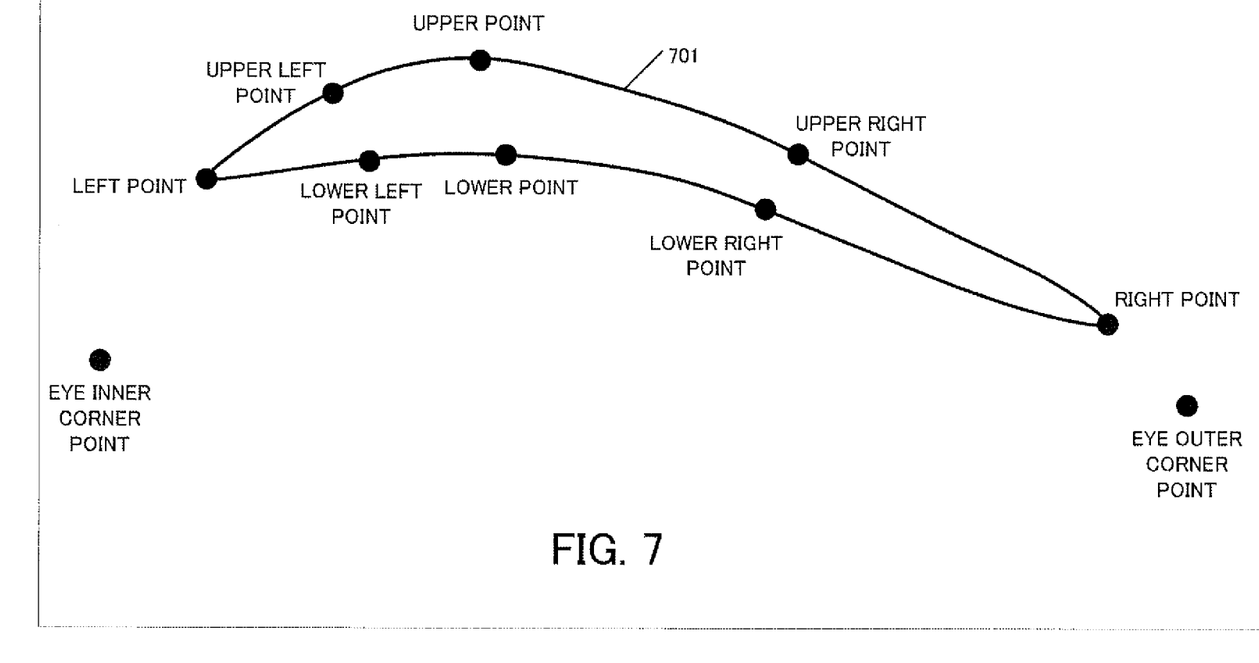
FIG. 7 is a diagram for explaining arrangement of feature points corresponding to an eyebrow.

The generation of the eyebrow region is performed using the feature points detected in step S132. FIG. 7 is a diagram showing a positional relation among feature points present around the eyebrow. Reference numeral 701 denotes a contour line of the eyebrow. Black points in the figure represent feature points. Among the feature points shown in FIG. 7, an "eye outer corner point" and an "eye inner corner point" are feature points detected with reference to the eye. The other points are feature points detected with reference to the eyebrow (feature points corresponding to the contour of the eyebrow).

Figure 8:
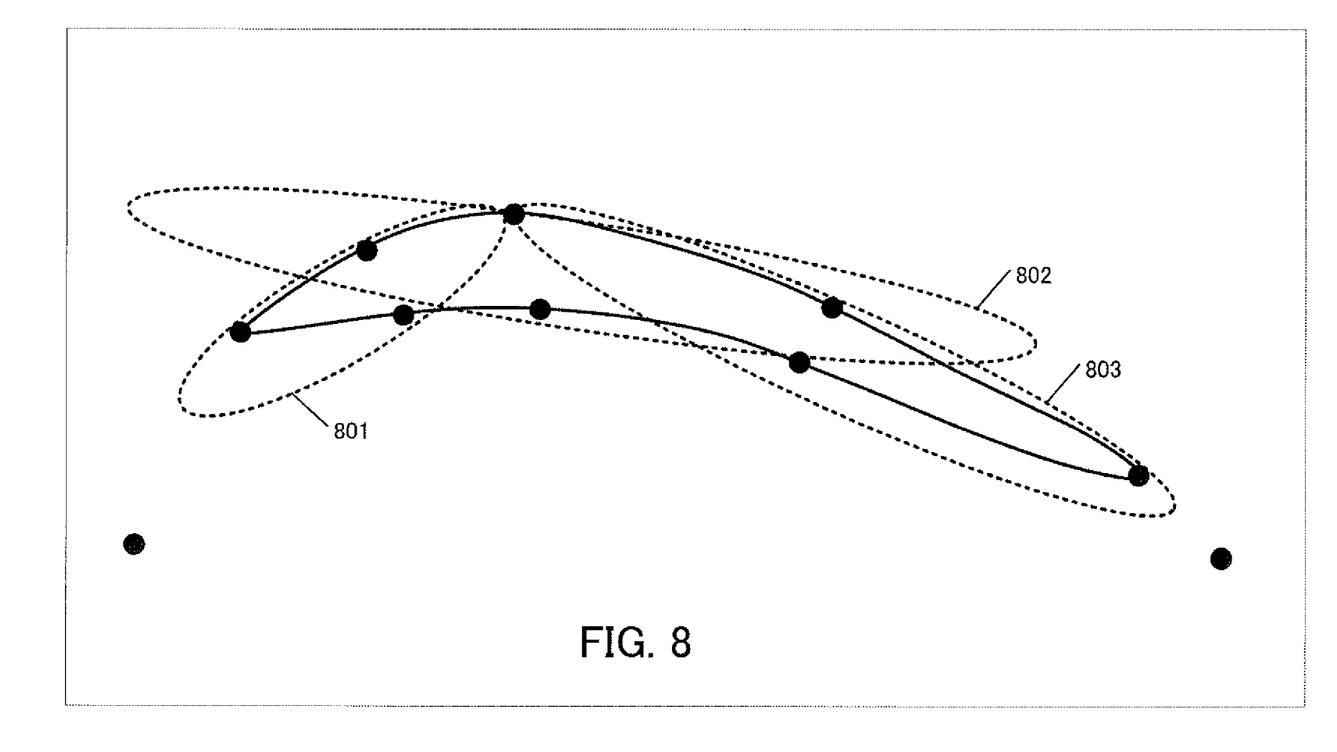
FIG. 8 is a diagram showing a first eyebrow region determined on the basis of the positions of the feature points.

The first eyebrow region is formed by three ellipses, i.e., a left circle (reference numeral 801), a center circle (reference numeral 802), and a right circle (reference numeral 803) indicated by dotted lines in FIG. 8.

Note that, in this embodiment, the first eyebrow region is generated using the three ellipses. However, the first eyebrow region may have a shape other than the illustrated shape as long as the first eyebrow region is a region including the eyebrow. The first eyebrow region may be generated by a method other than the illustrated method.

The ellipses can be defined by X coordinates and Y coordinates of the centers, vectors of major axes, and vectors of minor axes. A method of defining the respective ellipses using feature points is explained below.

(1) Definition Method for the Left Circle (Reference Numeral 801)

Center X coordinate: an X coordinate of an intermediate point between a left point and an upper left point Center Y coordinate: a Y coordinate of an intermediate point between a lower left point and the upper left point Major axis vector: a vector connecting an upper point and a point (an X coordinate of the left point and a Y coordinate of an intermediate point between the left point and the eye outer corner point)

Minor axis vector: A vector orthogonal to the major axis vector of the left circle and having length equal to the distance between the upper point and the lower point (2) Definition Method for the Center Circle (Reference Numeral 802)

Center X coordinate: an X coordinate of an intermediate point between a center point of the left circle and a center point of the right circle Center Y coordinate: a Y coordinate of the intermediate point between the lower left point and the upper left point Major axis vector: a vector connecting a right point and the left point Minor axis vector: A vector orthogonal to the major axis vector of the center circle and having length equal to the distance between the upper point and the lower point (3) Definition Method for the Right Circle (Reference Numeral 803)

Center X coordinate: an X coordinate of an intermediate point between the right point and an upper right point Center Y coordinate: a Y coordinate of an intermediate point between a lower right point and the upper right point Major axis vector: a vector connecting the upper point and a point (an X coordinate of the right point and a Y coordinate of an intermediate point between the right point and the eye inner corner point)

Minor axis vector: A vector orthogonal to the major axis vector of the right circle and having length equal to the distance between the upper point and the lower point The first eyebrow region is generated by the method defined above.

Figure 9:
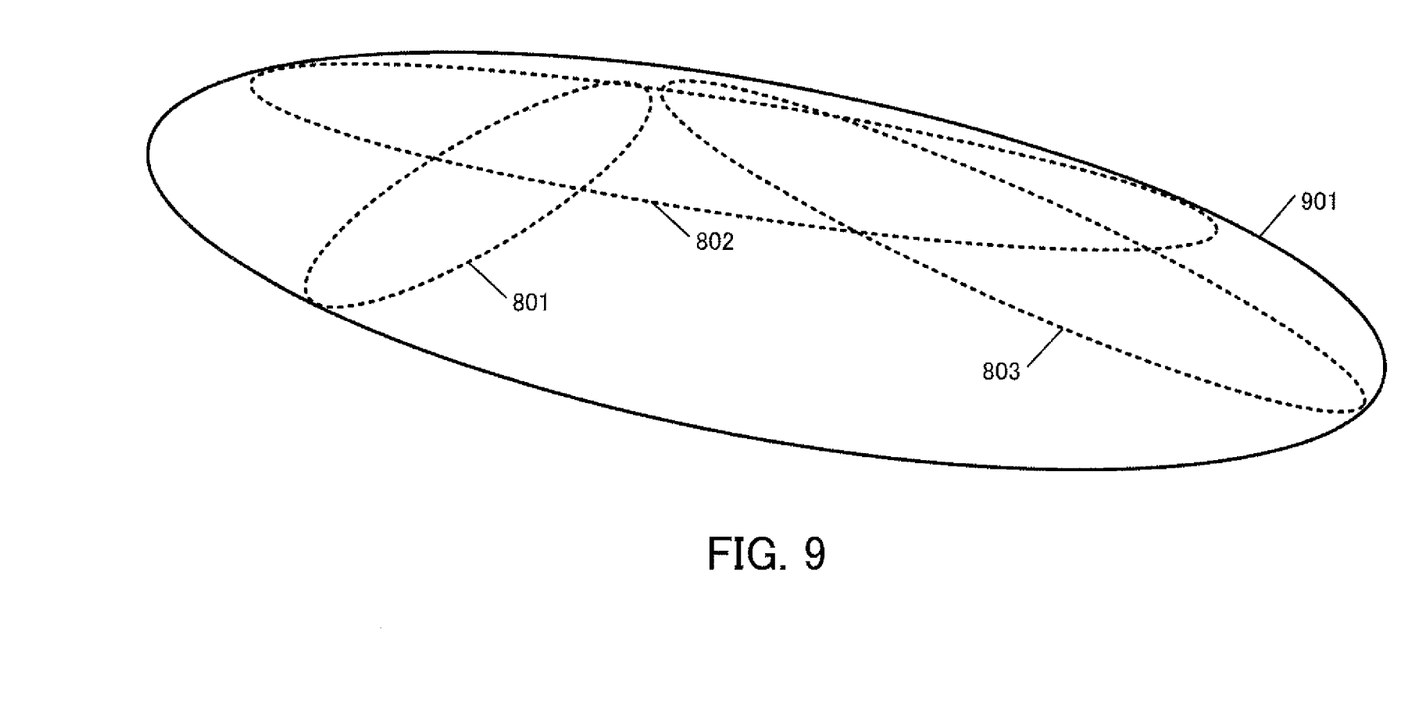
FIG. 9 is a diagram showing a relation between the first eyebrow region and a second eyebrow region.

Subsequently, the correction-region generating unit generates an ellipse region (reference numeral 901) in which the first eyebrow region is inscribed and sets the ellipse region as a second eyebrow region (step S142). FIG. 9 is a diagram showing a positional relation between the first eyebrow region and the second eyebrow region. Note that, in this example, the second eyebrow region is generated such that the first eyebrow region is inscribed in the second eyebrow region. However, a method of generating the second eyebrow region is not limited to this method as long as a region including the first eyebrow region and including a larger number of skin regions can be generated.

Subsequently, the partial-image generating unit 15 generates a partial image for correcting the face image using the representative pixel value generated in step S12 and the first eyebrow region and the second eyebrow region generated in step S14 (step S15).

Before explaining the processing in step S15, an overview of a method in which the image processing apparatus according to this embodiment corrects the face image is explained.

The first eyebrow region and the second eyebrow region are generated by the processing up to step S14. The region where the eyebrow is present is the first eyebrow region. Therefore, basically, the eyebrow can be removed by arranging pixels of a skin color (e.g., pixels having the representative pixel value) on the inside of the first eyebrow region. However, if the inside of the first eyebrow region is painted by a single pixel value, the image becomes unnatural because only the portion has no shade.

Therefore, rather than directly combining the representative pixel value, the image processing apparatus according to this embodiment selects, on the basis of the representative pixel value, pixels used for correction (correction pixels) from the periphery of the eyebrow and calculates, on the basis of the correction pixels, a pixel value in performing the combination.

Consequently, it is possible to make use of information concerning a shade present around the eyebrow. Therefore, it is possible to obtain a natural correction result.

Figure 10:
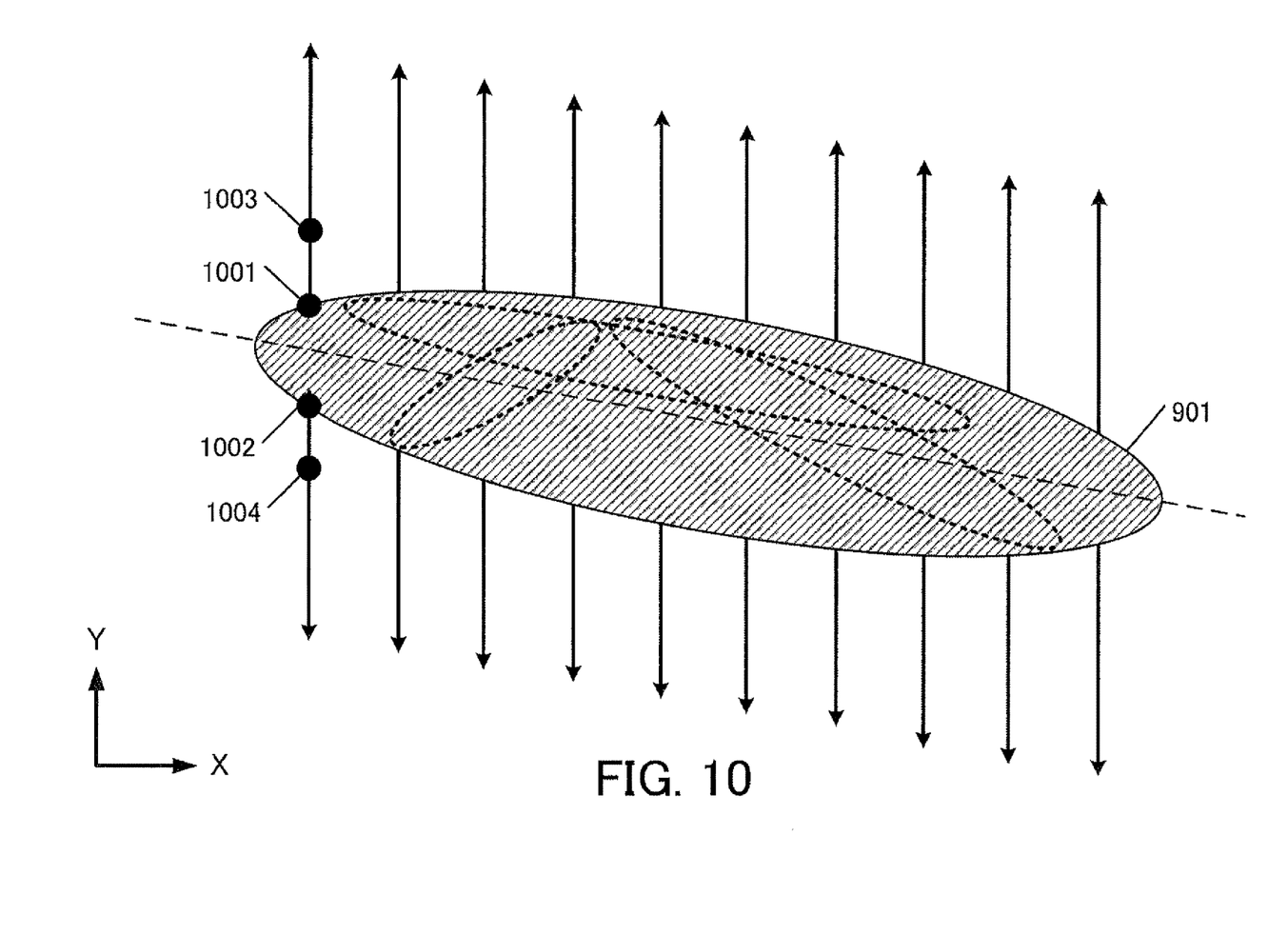
FIG. 10 is a diagram for explaining processing for generating a partial image.

The processing content in step S15 is specifically explained with reference to FIG. 10. A region indicated by a dotted line in FIG. 10 is the first eyebrow region. A region indicated by hatching is the second eyebrow region.

In this embodiment, scanning is performed by a predetermined distance toward the outer side from pixels present on the boundary line of the second eyebrow region to specify a pixel having a luminance component closest to a luminance component of the representative pixel value. Note that similarity of luminances can be determined by, for example, an absolute value of a difference between the luminances.

In an example shown in FIG. 10, it is assumed that, as a result of performing scanning toward a Y-axis positive direction from a pixel 1001, a pixel having most similar luminance is found in a pixel 1003. Similarly, it is assumed that, as a result of performing scanning toward a Y-axis negative direction from the pixel 1002, a pixel having most similar luminance is found in a pixel 1004.

A hue of the pixel 1003 is represented as A and a hue of the pixel 1004 is represented as B.

Subsequently, a pixel row connecting the pixel 1003 and the pixel 1004 is generated. When the pixel row is generated, linear interpolation is performed to determine hues of pixels such that colors sequentially transition from the hue A to the hue B. Consequently, a pixel row is generated in which the hues transition stepwise with gradations from the pixel 1003 to the pixel 1004.

When this processing is performed for all X coordinates, an image in which the first eyebrow region is painted out is obtained. Finally, a smoothing filter is applied to the image.

The image may be blurred by, for example, 3×3 blur filter. Consequently, it is possible to reduce an edge in the longitudinal direction.

An image obtained in this way is the partial image in the present invention.

The generated partial image is transmitted to the image correcting unit 16. The image correcting unit 16 executes, using the acquired partial image, processing for removing the eyebrow included in the face image (step S16).

Specifically, the image correcting unit 16 replaces the pixels included in the second eyebrow region of the face image with pixels included in the partial image. Note that, when the face image is separated into a plurality of channels of a Y component, a Cb component, a Cr component, and the like, after applying the processing only to the channels, the image correcting unit 16 only has to integrate the plurality of channels.

A corrected image is stored in a not-shown storage device or transmitted to the outside and provided to the user.

Note that, in the correction of the image, only the pixels included in the second eyebrow region may be simply replaced. However, in this case, the boundary of the second eyebrow region sometimes becomes unnatural. Therefore, a mixing ratio of the pixels included in the second eyebrow region and the pixels included in the partial image may be gradually changed near the boundary of the second eyebrow region. For example, a mask image for gradually reducing a degree of the correction may be generated further on the outer side than the boundary of the second eyebrow region. The combination may be performed using the mask image.

As explained above, the image processing apparatus according to this embodiment interpolates the inside of the first eyebrow region using the pixels present in the vicinity of the second eyebrow region to remove the eyebrow. The pixels used for the interpolation are pixels having pixel values close to the representative pixel value of the face and having information concerning the shade around the eyebrow. Therefore, compared with when the interpolation is performed with a single color or when the pixels in the vicinity are simply copied, it is possible to perform natural correction.

Modifications

The embodiment explained above is only an example. The present invention can be changed and carried out as appropriate without departing from the spirit of the present invention.

For example, in the explanation of the embodiment, the example is explained in which the eyebrow of the person is removed. However, a target of the removal may be anything included in the face of the person. The target of removal may be, for example, a mole, a freckle, a laugh line, a wrinkle, a birthmark, a dark ring around an eye, a scar, a treatment mark, a beard, or the like. In particular, as a target object is longer, more natural correction can be performed.

Note that, when an object other than the eyebrow is set as the removal target, in step S141, a first region including the target object only has to be generated and, in step S142, a second region including the first region and including a larger number of skin regions only has to be generated.

In the explanation of the embodiment, the removal target is determined on the basis of the detected feature points. However, the user of the apparatus may designate the removal target. For example, the user may designate a target region using a pointing device or the like.

In the explanation of the embodiment, as shown in FIG. 10, the pixel row is generated in a direction along the Y axis. However, the pixel row may be generated in a direction parallel to the minor axis of the ellipse (the first eyebrow region). As a direction in which the pixel row is generated is closer to the minor axis direction of the ellipse, the number of pixels to be interpolated further decreases. Therefore, more natural correction result can be obtained.

In the explanation of the embodiment, the image processing apparatus that applies the processing to the image stored in the storage device is explained as the example. However, the image does not always have to be acquired from the storage device and, for example, may be acquired from the outside of the apparatus via a wired or wireless network.

The present invention may be carried out as an image pickup apparatus having a function of removing any object by combining an image pickup unit that picks up an image and the image processing apparatus.

After the correction for removing the eyebrow is performed, correction for combining (drawing) an eyebrow anew may be performed.

What is claimed is:

1. An image processing apparatus that performs correction for removing an object from a face image, which is an image including a face of a person, the image processing apparatus comprising:
an image acquiring circuitry that acquires the face image;
a representative-pixel-value determining circuitry that determines a representative pixel value, which is a pixel value representing a skin region, on the basis of pixels included in the face image;
a region generating circuitry that generates a first region, which is a region including the object;
a correction-pixel determining circuitry that determines correction pixels, which are one or more pixels used for the correction, out of a plurality of pixels present in a vicinity of the first region, on the basis of similarity to the representative pixel value, wherein the correction pixels include a plurality of pairs of a first correction pixel and second correction pixel opposed to each other across the first region, each of the first and second correction pixel being specified by performing scanning a predetermined distance toward an outer side from a pixel present on a boundary line of the first region and specifying a pixel having a luminance component closest to a luminance component of the representative pixel value;
a partial-image generating circuitry that generates a partial image, which is a collection of pixels for replacing pixels corresponding to the object, using the correction pixels; and
a correcting circuitry that performs correction by combining the partial image with the face image,
wherein the partial-image generating circuitry generates, for each of the pairs, a pixel row for connecting the first correction pixel and the second correction pixel to generate a partial image in which the first region is interpolated, and
wherein the color of the pixels included in the pixel row changes stepwise from a color of the first correction pixel to a color of the second correction pixel.

2. The image processing apparatus according to claim 1, wherein
the first region is a region having an elliptical shape, and
the first correction pixels and the second correction pixels are pixels opposed to each other across the first region along a minor axis direction of the elliptical shape.

3. The image processing apparatus according to claim 1, wherein
the region generating circuitry further generates a second region which is included in the first region, includes the object, and includes a skin region smaller than the skin region of the first region, and
the correcting circuitry corrects the face image by combining the partial image inside the second region.

4. The image processing apparatus according to claim 1, wherein the partial-image generating circuitry further applies a smoothing filter to the generated partial image.

5. An image processing method performed by an image processing apparatus that performs correction for removing an object from a face image, which is an image including a face of a person, the image processing method comprising the steps of:
acquiring the face image;
determining a representative pixel value, which is a pixel value representing a skin region, on the basis of pixels included in the face image;
generating a first region, which is a region including the object;
determining correction pixels, which are one or more pixels used for the correction, out of a plurality of pixels present in a vicinity of the first region, on the basis of similarity to the representative pixel value, wherein the correction pixels include a plurality of pairs of a first correction pixel and second correction pixel opposed to each other across the first region, each of the first and second correction pixel being specified by performing scanning a predetermined distance toward an outer side from a pixel present on a boundary line of the first region and specifying a pixel having a luminance component closest to a luminance component of the representative pixel value;
generating a partial image, which is a collection of pixels for replacing pixels corresponding to the object, using the correction pixels; and
performing correction by combining the partial image with the face image,
wherein the generating of the partial image further includes generating, for each of the pairs, a pixel row for connecting the first correction pixel and the second correction pixel to generate a partial image in which the first region is interpolated, and
wherein the color of the pixels included in the pixel row changes stepwise from a color of the first correction pixel to a color of the second correction pixel.

6. A non-transitory computer readable storing medium recording a computer program for causing a computer to execute each of the steps of the image processing method according to claim 5.

* * * * *